(12) United States Patent
Li et al.

(10) Patent No.: US 11,200,679 B1
(45) Date of Patent: Dec. 14, 2021

(54) SYSTEM AND METHOD FOR GENERATING A PROBABILITY DISTRIBUTION OF A LOCATION OF AN OBJECT

(71) Applicant: Toyota Research Institute, Inc., Los Altos, CA (US)

(72) Inventors: Jie Li, Los Altos, CA (US); Kuan-Hui Lee, San Jose, CA (US); Arjun Bhargava, San Francisco, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 16/924,899

(22) Filed: Jul. 9, 2020

(51) Int. Cl.
*G06T 7/143* (2017.01)
*G06T 7/246* (2017.01)

(52) U.S. Cl.
CPC .............. *G06T 7/143* (2017.01); *G06T 7/246* (2017.01); *G06T 2207/10016* (2013.01); *G06T 2207/20076* (2013.01); *G06T 2207/20081* (2013.01); *G06T 2207/20084* (2013.01); *G06T 2207/30261* (2013.01)

(58) Field of Classification Search
CPC ............. G06T 2207/20084; G06T 7/11; G06T 2207/30252; G06T 2210/12; G06T 7/143; G06T 7/246; G06K 9/4604; G06K 9/6218
See application file for complete search history.

(56) References Cited

U.S. PATENT DOCUMENTS

2019/0102646 A1* 4/2019 Redmon .............. G06K 9/4652

OTHER PUBLICATIONS

Garnelo et al., "Neural Processes", 11 pages (Year: 2018).*
Feng et al., "Towards Safe Autonomous Driving: Capture Uncertainty in the Deep Neural Network for Lidar 3D Vehicle Detection," 2018 21st IEEE International Conference on Intelligent Transportation Systems, 9 pages.
Wong et al., "Not Seeing Is Also Believing: Combining Object and Metric Spatial Information." 2014 IEEE International Conference on Robotics and Automation (ICRA), 9 pages, (May 2014).
Miller et al., "Evaluating Merging Strategies for Sampling-based Uncertainty Techniques in Object Detection," 7 pages, arXiv:1809.06006v3 [cs.CV] Mar. 7, 2019.

(Continued)

*Primary Examiner* — Kenny A Cese
(74) *Attorney, Agent, or Firm* — Christopher G. Darrow; Darrow Mustafa PC

(57) ABSTRACT

An object detection system for generating a probability distribution of the location of an object includes one or more processors and a memory in communication with the one or more processors. The memory includes an image acquisition module, a bounding box generator module, and a probability distribution generator module. The image acquisition module causes the one or more processors to obtain a two-dimension image displaying an object. The bounding box generator module causes the one or more processors to generate, using the two-dimensional image as an input, a bounding box of the object displayed in the two-dimensional image having a plurality of pixels. The probability distribution generator module causes the one or more processors to generate a probability distribution of a bounding box location for the object using a neural process using a pair of context points, a latent space, and a centered pixel location.

20 Claims, 5 Drawing Sheets

(56) References Cited

OTHER PUBLICATIONS

Zhao et al., "Object Detection with Deep Learning: A Review," 21 pages, arXiv:1807.05511v2 [cs.CV] Apr. 16, 2019.
Sheikh, et al., "Bayesian Object Detection in Dynamic Scenes," Proceedings of the 2005 IEEE Computer Society Conference on Computer Vision and Pattern Recognition (CVPR'05), 6 pages.
Wong, "A Model Attention and Selection Framework for Estimation of Many Variables, with Applications to Estimating Object States in Large Spatial Environments," Proceedings of the Twenty-Eighth AAAI Conference on Artificial Intelligence, 2 pages (2014).
Wong, "Living and Searching in the World: Object-Based State Estimation for Mobile Robots," Twenty-Eighth AAAI Conference on Artificial Intelligence, pp. 3085-3086 (2014).
Hall et al., "Probabilistic Object Detection: Definition and Evaluation," 21 pages, arXiv:1811.10800v4 [cs.CV] Jan. 30, 2020.
Tian et al., "FCOS: Fully Convolutional One-Stage Object Detection," 13 pages, arXiv:1904.01355v5 [cs.CV] Aug. 20, 2019.
Garnelo et al., "Neural Processes," 11 pages, arXiv:1807.01622v1 [cs.LG] Jul. 4, 2018.

\* cited by examiner

SYSTEM AND METHOD FOR GENERATING A PROBABILITY DISTRIBUTION OF A LOCATION OF AN OBJECT

TECHNICAL FIELD

The subject matter described herein relates, in general, to systems and methods for generating a probability distribution of the location of an object.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some current vehicles have an object detection system that can determine the general location of one or more objects. These vehicles may include sensors, such as cameras, LIDAR sensors, radar sensors, sonar sensors, and the like and use information collected from the sensors to determine the presence of objects. Typically, information from the sensors is used to generate one or more bounding boxes that generally indicate the size and the position of the object.

Object tracking systems and/or other systems, such as active safety systems, may then track and/or monitor the movement of the bounding boxes in relation to the vehicle. Based on the movement of the bounding boxes in relation to the vehicle, the vehicle may take any one of several different actions to safely navigate the vehicle such that the vehicle does not collide with the object delineated by the bounding box. However, current object detection systems are deterministic in nature. Moreover, current object detection systems create a fixed object result, for example, one or more bounding boxes. This fixed object result does not include any information regarding probabilistic determinations, which may be useful to downstream applications.

SUMMARY

This section generally summarizes the disclosure and is not a comprehensive explanation of its full scope or all its features.

In one embodiment, an object detection system is configured to generate a probability distribution of the location of an object. The system may include one or more processors and a memory in communication with the one or more processors. The memory may include one or more modules for configuring the processor to perform any one of several different functions. In this embodiment, the memory may include an image acquisition module, a bounding box generator module, and a probability distribution generator module. With regards to the image acquisition module, the image acquisition module includes instructions that, when executed by the one or more processors, cause the one or more processors to obtain a two-dimensional image displaying an object. One or more sensors, such as a camera sensor, may generate the two-dimensional image.

The bounding box generator module includes instructions that, when executed by the one or more processors, cause the one or more processors to generate, using the two-dimensional image as an input, a bounding box of the object displayed in the two-dimensional image. This bounding box may include a plurality of pixels.

The probability distribution generator module may include instructions that, when executed by the one or more processors, cause the one or more processors to generate for each pixel of the plurality of pixels forming the bounding box, a pixel location ($x_c$) and a bounding box value ($y_c$) of the object based on the pixel location ($x_c$). Additionally, the probability distribution module includes instructions that cause the one or more processors to generate a probability distribution of a bounding box location ($Y_T$) for the object. The probability distribution of the bounding box location ($Y_T$) is generated using a neural process using a pair of context points ($y_C$, $x_C$), a latent space (z), and a centered pixel location ($X_T$), the centered pixel location ($X_T$) being a location of a center pixel of the bounding box.

In another embodiment, related to a method, an object detection method may include the steps of obtaining a two-dimension image displaying an object, generating a bounding box of the object displayed in the two-dimensional image having a plurality of pixels, generating for each pixel of the plurality of pixels forming the bounding box, a pixel location ($x_c$) and a bounding box value ($y_c$) of the object based on the pixel location ($x_c$), and generating a probability distribution of a bounding box location ($Y_T$) for the object. The probability distribution of the bounding box location ($Y_T$) is generated using a neural process using a pair of context points ($y_C$, $x_C$), a latent space (z), and a centered pixel location ($X_T$), the centered pixel location ($X_T$) being a location of a center pixel of the bounding box.

In yet another embodiment, a non-transitory computer-readable medium may include instructions that, when executed by one or more processors cause the one or more processors to obtain a two-dimension image displaying an object, generate a bounding box of the object displayed in the two-dimensional image having a plurality of pixels, generate for each pixel of the plurality of pixels forming the bounding box, a pixel location ($x_c$) and a bounding box value ($y_c$) of the object based on the pixel location ($x_c$), and generate a probability distribution of a bounding box location ($Y_T$) for the object. The probability distribution of the bounding box location ($Y_T$) is generated using a neural process using a pair of context points ($y_C$, $x_C$), a latent space (z), and a centered pixel location ($X_T$), the centered pixel location ($X_T$) being a location of a center pixel of the bounding box.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described is a system and method that is able to generate a probability distribution of a bounding box location using a neural process. Moreover, the neural process, during an inference time, is provided a set of context points ($y_C$, $x_C$), a value z drawn from a random distribution, and a target point ($X_T$). The neural process can predict the corresponding estimation of a probability distribution ($Y_T$) utilizing the neural process and the inputs specified above.

Current object detection systems are deterministic in nature. That is, these object detection systems generate a fixed result, for example, one or more bounding boxes defining the location of one or more objects. However, downstream applications utilizing object detection information are generally probabilistic in nature. For example, downstream applications regarding the control of an autonomous vehicle rely on numerous probabilities, such as the probability that the object defined by the bounding box is an actual object and/or the uncertainty in the position of the bounding box. Currently, this information is not provided by the object detection algorithm but is rather determined by some off-line heuristic estimation, which may be inaccurate. The system and method described in this specification is able to generate a probability distribution of a bounding box location using a neural process that can indicate that the object defined by the bounding box is an actual object and/or the uncertainty in the position of the bounding box.

Figure 1:
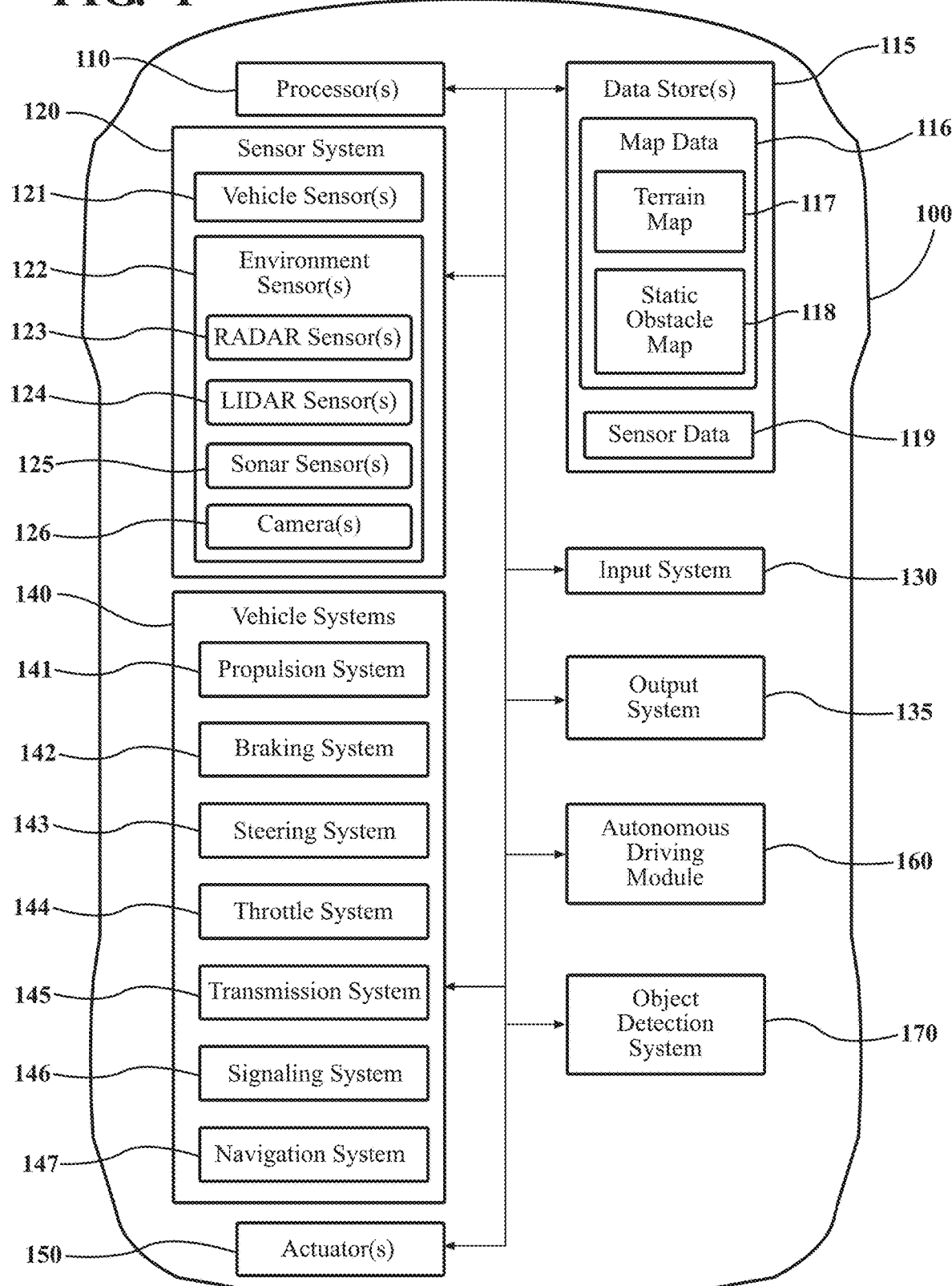
FIG. 1 illustrates a vehicle incorporating a system for generating a probability distribution of the location of an object.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to the autonomous driving module(s) 160.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes an object detection system 170. The object detection system 170 may be incorporated within the autonomous driving module(s) 160 or may be separate as shown. The object detection system 170 may be able to detect one or more objects. Moreover, as will be explained in greater detail later in this specification, the object detection system 170 generates a probability distribution of a bounding box location using a neural process. Moreover, the neural process, during an inference time, is provided a set of context points, a value z drawn from a random distribution, and a target point. The neural process can predict the corresponding estimation of a probability distribution utilizing the neural process and that the inputs specified above.

Figure 2:
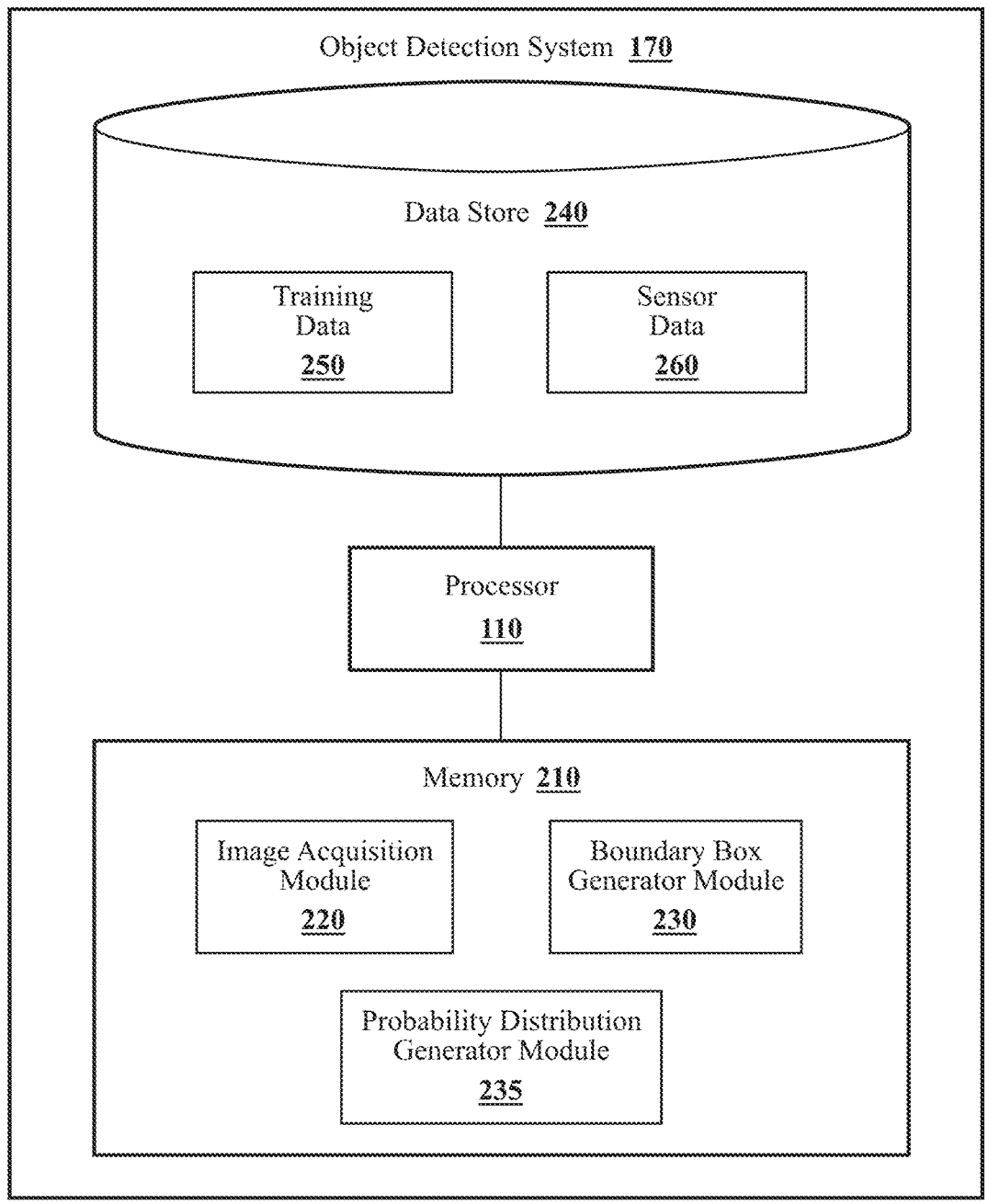
FIG. 2 illustrates a more detailed block diagram of the system for generating a probability distribution of the location of an object.

With reference to FIG. 2, one embodiment of the object detection system 170 is further illustrated. As shown, the object detection system 170 includes a processor(s) 110. Accordingly, the processor(s) 110 may be a part of the object detection system 170, or the object detection system 170 may access the processor(s) 110 through a data bus or another communication path. In one or more embodiments, the processor(s) 110 is an application-specific integrated circuit that is configured to implement functions associated with an image acquisition module 220, a bounding box generator module 230, and/or a probability distribution generator module 235. In general, the processor(s) 110 is an electronic processor such as a microprocessor that is capable of performing various functions as described herein. In one embodiment, the object detection system 170 includes a memory 210 that stores the image acquisition module 220, the bounding box generator module 230, and/or the probability distribution generator module 235. The memory 210 is a random-access memory (RAM), read-only memory (ROM), a hard disk drive, a flash memory, or other suitable memory for storing the modules 220, 230, and/or 235. The modules 220, 230, and/or 235 are, for example, computer-readable instructions that, when executed by the processor(s) 110, cause the processor(s) 110 to perform the various functions disclosed herein.

Furthermore, in one embodiment, the object detection system 170 includes a data store 240. The data store 240 is, in one embodiment, an electronic data structure such as a database that is stored in the memory 210 or another memory and that is configured with routines that can be executed by the processor(s) 110 for analyzing stored data, providing stored data, organizing stored data, and so on. Thus, in one embodiment, the data store 240 stores data used by the modules 220, 230, and/or 235 in executing various functions. In one embodiment, the data store 240 includes training data 250 which may be utilized to train the neural process that will be described later in this specification and/or sensor data 260 which may be one or more images captured from the environment sensors 122, such as images captured by the camera(s) 126. The sensor data 260 may include some or all of the sensor data 119 shown in FIG. 1 and described later in this disclosure.

Figure 3:
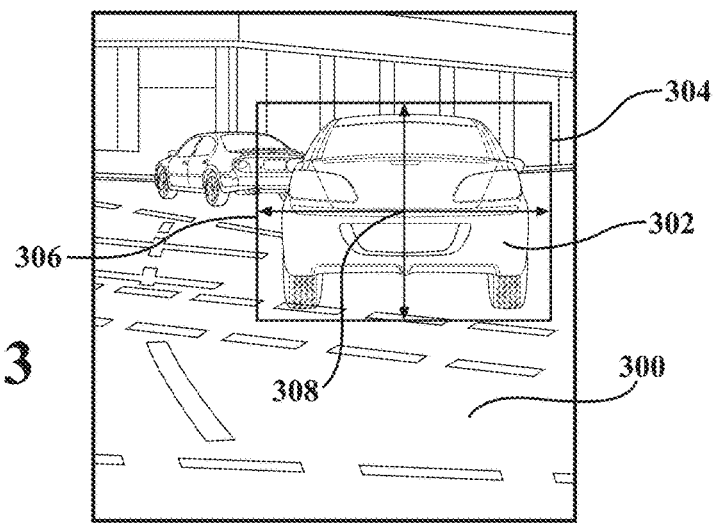
FIG. 3 illustrates an example of a bounding box defining the location of an object.

Accordingly, the image acquisition module 220 has instructions that, when executed by the one or more processor(s) 110, cause the processor(s) 110 to obtain a two-dimensional image displaying an object. In one example, the two-dimensional image may be captured from the camera(s) 126 of the environment sensors 122. FIG. 3 illustrates one example of an image 300 captured by the camera(s) 126. Here, the image 300 is made up of a plurality of pixels each having a pixel location. The image 300 also includes an object 302 which may be in the form of an automobile.

The bounding box generator module 230 includes instructions that, when executed by the processor(s) 110, cause the processor(s) 110 to generate, using the two-dimensional image 300 as an input, one or more bounding boxes of the object displayed in the two-dimensional image. For example, referring again to FIG. 3, the bounding box generator module 230 utilizes the image 300 is an input. The bounding box generator module 230 causes the processor(s) 110 to generate at least one bounding box 304 that generally surrounds the object 302. The bounding box may be defined by a four-dimensional vector 306. The four-dimensional vector 306 may depict the relative offsets from the four sides of the bounding box 304 to a location within the bounding box 304. The bounding box 304 may also include a center pixel location 308. Generally, the center pixel location 308 indicates the center of the bounding box 304. While only one bounding box 304 is illustrated in FIG. 3, it should be understood that the bounding box generator module 230 may cause the processor(s) 110 to generate a plurality of different bounding boxes around the object 302 with different center pixels associated with each.

Figure 4:
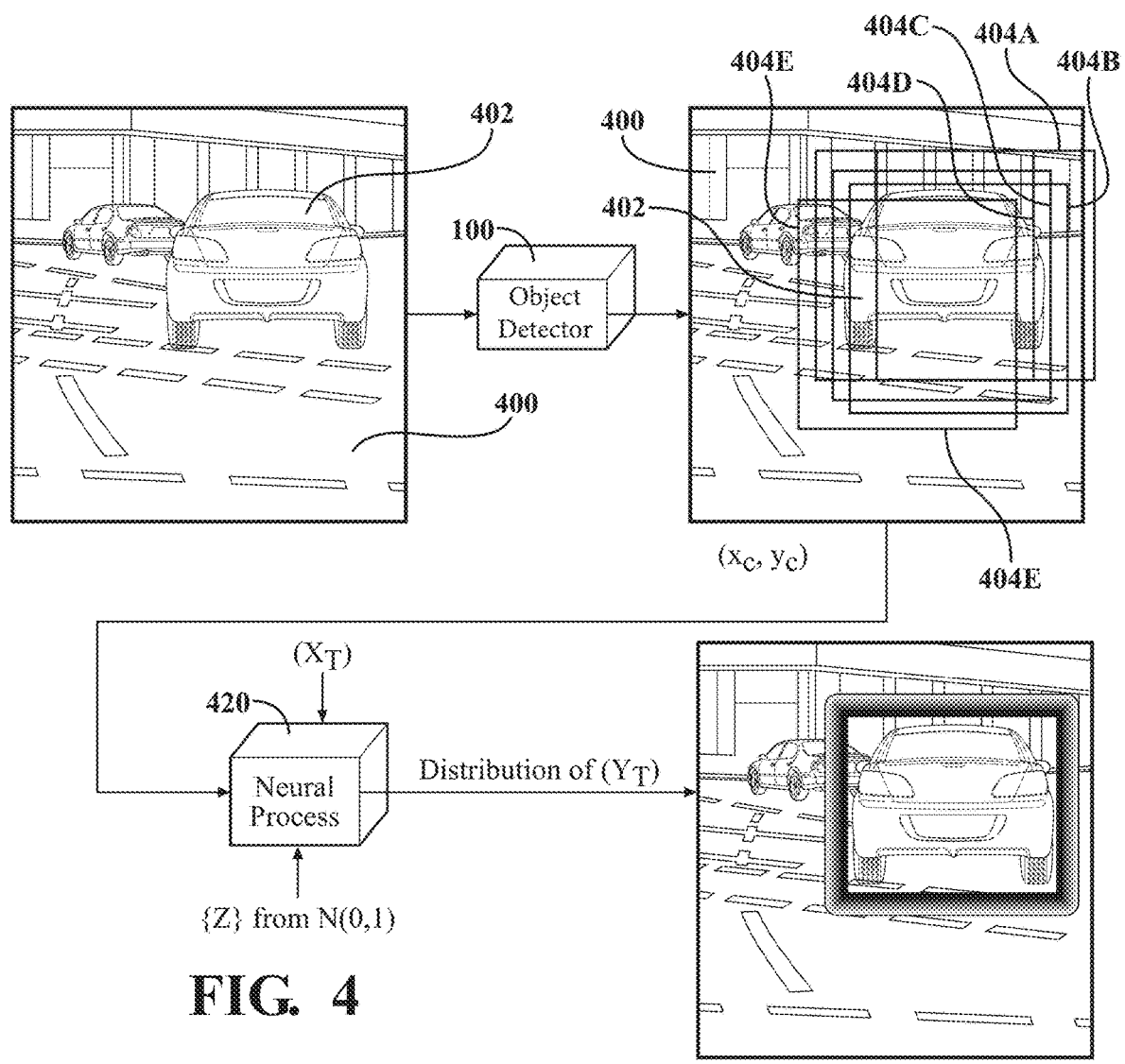
FIG. 4 illustrates a flow diagram detailing the flow of information processed and/or generated by the system for generating a probability distribution of the location of an object.

For example, referring to FIG. 4, the bounding box generator module 230 may utilize a single stage object detector 410. In one example, the single stage object detector 410 may be a fully convolutional one stage object detector to solve object detection in a per pixel prediction fashion. However, it should be understood that any type of single stage object detector may be utilized. Moreover, the single stage object detector 410 may be a fully convolutional anchor free single stage detector. The single stage object detector 410 utilizes a feature pyramid network (FPN) to create feature maps and adding a head after every feature maps to train classification, bounding box regression and an index called center-ness. Center-ness is a threshold given for each bounding box to be considered for computation. The single stage object detector 410 works by predicting the four-dimensional vector 306 encoding the location of a bounding box at each foreground pixel, supervised by ground-truth bounding box information during training.

When in the inference mode, the single stage object detector 410 generates a final score, used for ranking the detected bounding boxes, computed by multiplying the predicted center-ness with the corresponding classification score. Eventually, the single stage object detector 410 outputs a plurality of bounding boxes 404A-404E that are each defined by four-dimensional vector and include a center pixel indicating the center of each of the bounding boxes 404A-404E.

However, it should be understood while the example given above utilizes a single stage object detector type detector, other types of methods for generating bounding boxes could also be utilized, such as more traditional methods that rely on a set of predefined anchor boxes, such as Fast R-CNN as well as others.

The probability distribution generator module 235 includes instructions that, when executed by the processor(s) 110, cause the processor(s) 110 a probability distribution 430 of a bounding box location ($Y_T$) for the object 402. The generation of the probability distribution 430 is achieved by utilizing a neural process 420. A neural process 420, broadly, may be defined as a neural network based probabilistic model which can represent a distribution over stochastic processes.

Figure 5A:
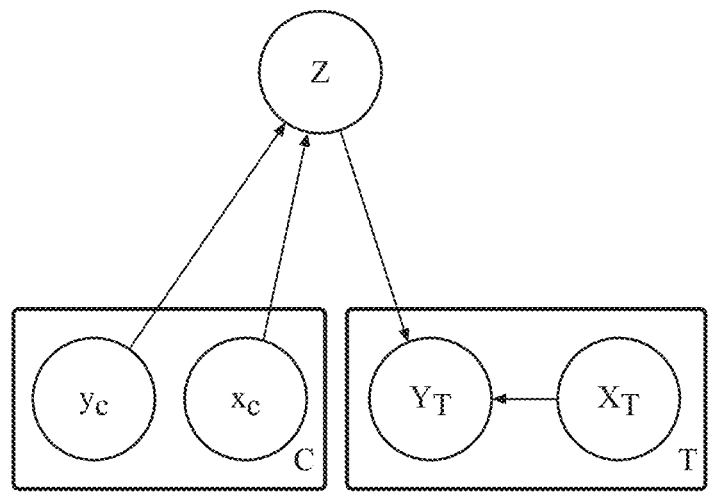
FIG. 5A illustrates a graphical diagram of a neural process.
Figure 5B:
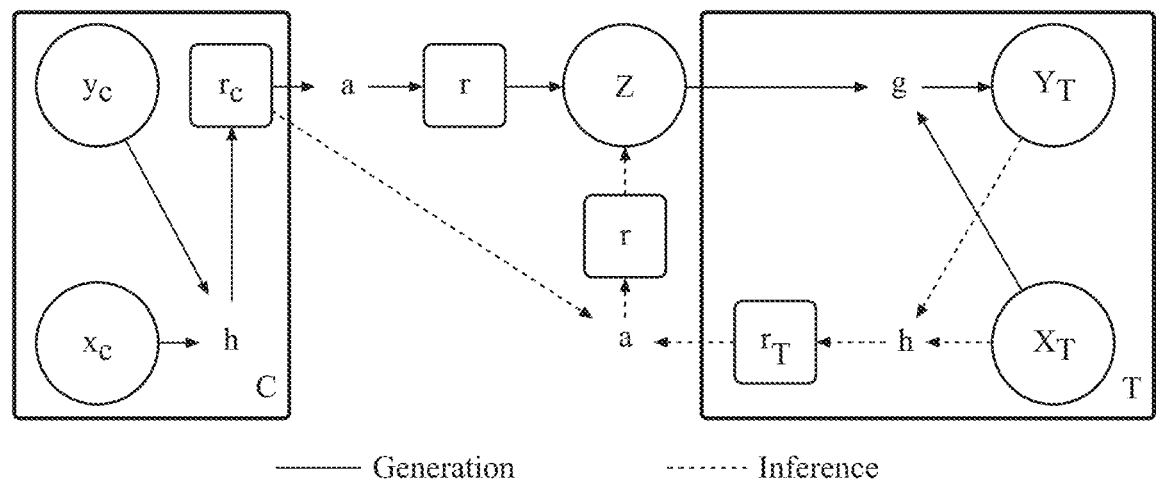
FIG. 5B illustrates a computational diagram of a neural process.

In order to better understand the neural process 420, reference is made to FIGS. 5A and 5B. FIG. 5A illustrates a graphical model of the neural process 420, while FIG. 5B illustrates a computational diagram of the neural process 420. The neural process shown in FIGS. 5A and 5B may be designed to learn distributions over functions from distributions over datasets. Moreover, consider a set of datasets, D. For each dataset in D with input-output pairs $\{(x_i, y_i)\}_{i=1}^{M}$, a context set, $C=\{(x_i, y_i)\}_{i=1}^{M}$ is defined, and a target set, $T=\{(x_i, y_i)\}_{i=1}^{N}$ with $C \subseteq T$ in general. For a given dataset in D, the context data is denoted by $\{X_C, Y_C\}$ and the target data by $\{X_T, Y_T\}$.

To describe the neural process, a Gaussian likelihood may be defined as follows:

$$p(Y|Z,X)=N(Y;g_\theta(Z,X),\tau^{-1}I),$$

where Z is a latent variable and $g_\theta(Z, X)$ is a decoder function parameterized by a deep neural network with parameters $\theta$.

For a standard Gaussian prior over Z, $p(Z)=N(Z; 0, I)$, the generative model of the neural process is then given by:

$$p(Y,Z|X)=p(Y|Z,X)p(Z)=N(Y;g_\theta(Z,X),\tau-1\ I)N(Z;0,I).$$

To perform approximate inference by the neural process, a variational distribution is defined as:

$$q(Z|X,Y)=N(Z;\mu_\omega(a(h_\psi(X,Y))),\Sigma_\omega(a(h_\psi(X,Y)))),$$

where $h_\psi(\cdot)$ is an encoder function parameterized by a deep neural network with parameters $\psi$, $a(\cdot)$ is an aggregator function, and $\mu_\omega(\cdot)$ and $\Sigma_\omega(\cdot)$ take aggregated and encoded input-output pairs as inputs and parameterize a normal distribution from which Z is sampled. The latent variable Z is designed to capture all the information about the data-generating process needed to make predictions on the target inputs Still referring to FIGS. 5A and 5B, using the neural process 420, the probability distribution of the bounding box location ($Y_T$) is generated using a pair of context points ($y_C$, $x_C$), a latent space (z), and a centered pixel location ($X_T$). In this example, context points ($y_C$, $x_C$). The pair of context points ($y_C$, $x_C$) may include a pixel location ($x_c$) and a probability ($y_C$) that a pixel at the pixel location ($x_c$) form part of the object. The centered pixel location ($X_T$) being a location of a center pixel of the bounding box. As explained above, the latent space (z) may be sampled from a known distribution. The known distribution is pre-selected as a parameter set used during training time.

Using this information, the neural process 420 is able to generate a probability distribution 430 of the bounding box location ($Y_T$). the probability distribution of the bounding box location ($Y_T$) is a multinomial Gaussian distribution. The multinomial Gaussian distribution may be expressed as:

$$Y_T = N(\mu, \Sigma),$$

where μ is a 4-dimensional position of the bounding box position and Σ is a 4×4 matrix describing the probability distribution around μ.

As such, the probability distribution 430 is illustrated as a type of bounding box that surrounds the object 402. Here, the probability distribution 430 has different pixel values that indicate the likelihood that the bounding box defines an object. Moreover, pixels located towards the center of the probability distribution 430 have values indicating a greater likelihood that an object is present, while pixels located further outward from the center of the probability distribution 430 have less intense values, indicating the lesser likelihood that an object is present.

Figure 6:
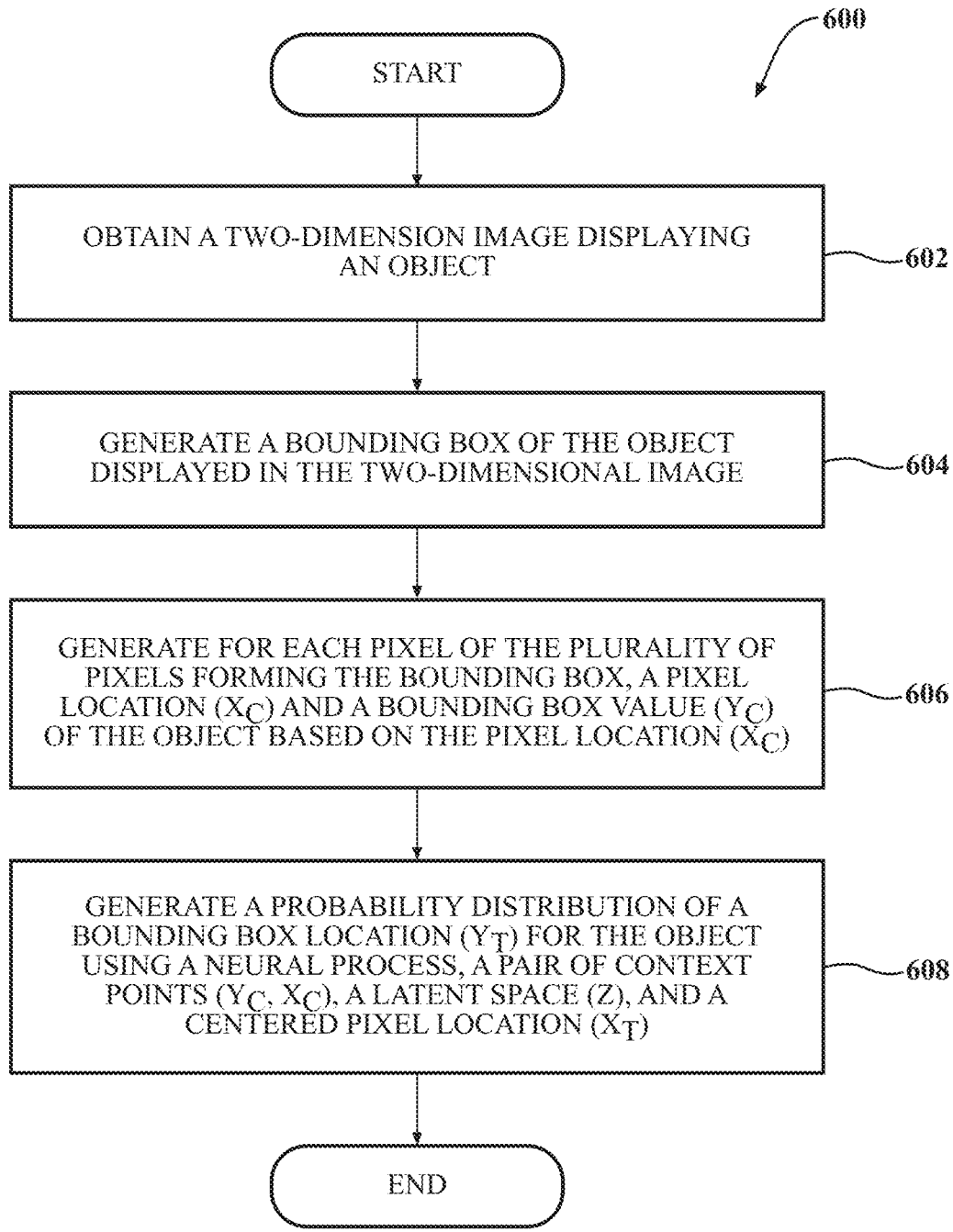
FIG. 6 illustrates a method for generating a probability distribution of the location of an object using a neural process.

Referring to FIG. 6, a method 600 for generating a probability distribution of a bounding box location is shown. The method 600 will be described from the viewpoint of the vehicle 100 of FIG. 1 and the object detection system 170 of FIG. 2. However, it should be understood that this is just one example of implementing the method 600. While method 600 is discussed in combination with the object detection system 170, it should be appreciated that the method 600 is not limited to being implemented within the object detection system 170, but is instead one example of a system that may implement the method 600.

The method 600 begins at step 602, wherein the image acquisition module 220 has instructions that, when executed by the processor(s) 110 cause the processor(s) 110 to obtain a two-dimension image displaying an object. In one example, the two-dimensional image may be captured from the camera(s) 126 of the environment sensors 122.

In step 604, the bounding box generator module 230 includes instructions that, when executed by the processor(s) 110, cause the processor(s) 110 to generate, using the two-dimensional image as an input, a bounding box of the object displayed in the two-dimensional image. For example, referring again to FIG. 3, the bounding box generator module 230 utilizes the image 300 is an input. The bounding box generator module 230 causes the processor(s) 110 to generate at least one bounding box 304 that generally surrounds the object 302. The bounding box may be defined by a four-dimensional vector 306. The four-dimensional vector 306 may depict the relative offsets from the four sides of the bounding box 304 to a location within the bounding box 304.

As explained previously, the bounding box generator module 230 may utilize a single stage object detector 410 to solve object detection in a per pixel prediction fashion. Moreover, the single stage object detector 410 may be a fully convolutional anchor free single stage detector. The single stage object detector 410 utilizes a feature pyramid network (FPN) to create feature maps and adding head after every feature maps to train classification, bounding box regression and an index called center-ness. Center-ness is a threshold given for each bounding box to be considered for compu- tation. The single stage object detector 410 receives the image 400 and works by predicting the four-dimensional vector 306 encoding the location of a bounding box at each foreground pixel, supervised by ground-truth bounding box information during training.

When in the inference mode, the single stage object detector 410 receives the image 400 and generates a final score, used for ranking the detected bounding boxes, computed by multiplying the predicted center-ness with the corresponding classification score. Thus, the center-ness can down-weight the scores of bounding boxes far from the center of an object. As a result, with high probability, these low-quality bounding boxes might be filtered out by the final non-maximum suppression (NMS) process, improving the detection performance remarkably. Eventually, the single stage object detector 410 outputs a plurality of bounding boxes 404A-404E that are each defined by four-dimensional vector and include a center pixel indicating the center of each bounding box.

Next, in step 606, the probability distribution generator module 235 causes the processor(s) 110 to generate for each pixel of the plurality of pixels forming the bounding box, a pixel location ($x_c$) and a bounding box value ($y_c$) of the object based on the pixel location ($x_c$). Next, in step 608, utilizing a neural process, which was explained above, the probability distribution generator module 235 generates a probability distribution of the bounding box location ($Y_T$) is generated using a pair of context points ($y_C$, $x_C$), a latent space (z), and a centered pixel location ($X_T$), the centered pixel location ($X_T$) being a location of a center pixel of the bounding box.

FIG. 1 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the object detection system 170 to ensure the vehicle 100 remains within defined state constraints.

The vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data store(s) 115 for storing one or more types of data. The data store(s) 115 can include volatile and/or non-volatile memory. Examples of data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data store(s) 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data store(s) 115 located onboard the vehicle 100. Alternatively, or in addition, at least a portion of the map data 116 and/or the sensor data 119 can be located in one or more data store(s) 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify, and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensor(s) 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more camera(s) 126. In one or more arrangements, the one or more camera(s) 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the object detection system 170, and/or the autonomous driving module(s) 160 can be operatively connected to communicate with the vehicle systems 140 and/or individual components thereof. For example, returning to FIG. 1, the processor(s) 110 and/or the autonomous driving module(s) 160 can be in communication to send and/or receive information from the vehicle systems 140 to control the movement, speed, maneuvering, heading, direction, etc. of the vehicle 100. The processor(s) 110, the object detection system 170, and/or the autonomous driving module(s) 160 may control some or all of these vehicle systems 140 and, thus, may be partially or fully autonomous.

The processor(s) 110, the object detection system 170, and/or the autonomous driving module(s) 160 can be operatively connected to communicate with the vehicle systems 140 and/or individual components thereof. For example, returning to FIG. 1, the processor(s) 110, the object detection system 170, and/or the autonomous driving module(s) 160 can be in communication to send and/or receive information from the vehicle systems 140 to control the movement, speed, maneuvering, heading, direction, etc. of the vehicle 100. The processor(s) 110, the object detection system 170, and/or the autonomous driving module(s) 160 may control some or all of these vehicle systems 140.

The processor(s) 110, the object detection system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the object detection system 170, and/or the autonomous driving module(s) 160 can control the direction and/or speed of the vehicle 100. The processor(s) 110, the object detection system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving module(s) 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the object detection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 260. "Driving maneuver," means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product, which comprises all the features enabling the implementation of the methods described herein, and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An object detection system comprising:
   one or more processors; and
   a memory in communication with the one or more processors, the memory having:
   an image acquisition module, the image acquisition module having instructions, that, when executed by the one or more processors, cause the one or more processors to obtain a two-dimension image displaying an object,
   a bounding box generator module, the bounding box generator module having instructions, that, when executed by the one or more processors, cause the one or more processors to generate, using the two-dimensional image as an input, a bounding box of the object displayed in the two-dimensional image, the bounding box having a plurality of pixels, and
   a probability distribution generator module, the probability distribution generator module having instructions, that, when executed by the one or more processors, cause the one or more processors to generate for each pixel of the plurality of pixels forming the bounding box, a pixel location ($x_c$) and a bounding box value ($y_c$) of the object based on the pixel location ($x_c$), generate a probability distribution of a bounding box location ($Y_T$) for the object, wherein the probability distribution of the bounding box location ($Y_T$) is generated using a neural process using a pair of context points ($y_C$, $x_C$), a latent space (z), and a centered pixel location ($X_T$), the centered pixel location ($X_T$) being a location of a center pixel of the bounding box.

2. The object detection system of claim 1, wherein the pair of context points ($y_C$, $x_C$) comprise a pixel location ($x_c$) and a probability ($y_C$) that a pixel at the pixel location ($x_c$) form part of the object.

3. The object detection system of claim 1, wherein the probability distribution generator module further includes instructions, that, when executed by the one or more processors, cause the one or more processors to sample the latent space (z) from a known distribution.

4. The object detection system of claim 3, wherein the known distribution is pre-selected as a parameter set used during training time.

5. The object detection system of claim 1, wherein the bounding box is defined by a four-dimensional vector.

6. The object detection system of claim 1, wherein the probability distribution of the bounding box location ($Y_T$) is a multinomial Gaussian distribution.

7. The object detection system of claim 6, wherein the multinomial Gaussian distribution is expressed as:

$$Y_T = N(\mu, \Sigma),$$

where $\mu$ is a 4-dimensional position of the bounding box position and $\Sigma$ is a 4×4 matrix describing the probability distribution around $\mu$.

8. An object detection method comprising the steps of:
   obtaining a two-dimension image displaying an object;
   generating, using the two-dimensional image as an input, a bounding box of the object displayed in the two-dimensional image, the bounding box having a plurality of pixels;
   generating for each pixel of the plurality of pixels forming the bounding box, a pixel location ($x_c$) and a bounding box value ($y_c$) of the object based on the pixel location ($x_c$);
   generating a probability distribution of a bounding box location ($Y_T$) for the object; and
   wherein the probability distribution of the bounding box location ($Y_T$) is generated using a neural process using a pair of context points ($y_C$, $x_C$), a latent space (z), and a centered pixel location ($X_T$), the centered pixel location ($X_T$) being a location of a center pixel of the bounding box.

9. The object detection method of claim 8, wherein the pair of context points ($y_C$, $x_C$) comprise a pixel location ($x_c$) and a probability ($y_C$) that a pixel at the pixel location ($x_c$) form part of the object.

10. The object detection method of claim 8, further comprising the step of sampling the latent space (z) from a known distribution.

11. The object detection method of claim 10, wherein the known distribution is pre-selected as a parameter set used during training time.

12. The object detection method of claim 8, wherein the bounding box is defined by a four-dimensional vector.

13. The object detection method of claim 8, wherein the probability distribution of the bounding box location ($Y_T$) is a multinomial Gaussian distribution.

14. The object detection method of claim 13, wherein the multinomial Gaussian distribution is expressed as:

$$Y_T = N(\mu, \Sigma),$$

where $\mu$ is a 4-dimensional position of the bounding box position and $\Sigma$ is a 4×4 matrix describing the probability distribution around $\mu$.

15. A non-transitory computer-readable medium storing instructions that, when executed by one or more processors, cause the one or more processors to:
   obtain a two-dimension image displaying an object;
   generate, using the two-dimensional image as an input, a bounding box of the object displayed in the two-dimensional image, the bounding box having a plurality of pixels;
   generate for each pixel of the plurality of pixels forming the bounding box, a pixel location ($x_c$) and a bounding box value ($y_c$) of the object based on the pixel location ($x_c$);
   generate a probability distribution of a bounding box location ($Y_T$) for the object; and
   wherein the probability distribution of the bounding box location ($Y_T$) is generated using a neural process using a pair of context points ($y_C$, $x_C$), a latent space (z), and a centered pixel location ($X_T$), the centered pixel location ($X_T$) being a location of a center pixel of the bounding box.

16. The non-transitory computer-readable medium of claim 15, wherein the pair of context points $(y_C, x_C)$ comprise a pixel location $(x_c)$ and a probability $(y_C)$ that a pixel at the pixel location $(x_c)$ form part of the object.

17. The non-transitory computer-readable medium of claim 15, further comprising instructions, that, when executed by the one or more processors, cause the one or more processors to sample the latent space (z) from a known distribution.

18. The non-transitory computer-readable medium of claim 17, wherein the known distribution is pre-selected as a parameter set used during training time.

19. The non-transitory computer-readable medium of claim 15, wherein the probability distribution of the bounding box location $(Y_T)$ is a multinomial Gaussian distribution.

20. The non-transitory computer-readable medium of claim 19, wherein the multinomial Gaussian distribution is expressed as:

$$Y_T = N(\mu, \Sigma),$$

where $\mu$ is a 4-dimensional position of the bounding box position and $\Sigma$ is a 4×4 matrix describing the probability distribution around $\mu$.

* * * * *